United States Patent

Nishino et al.

[11] Patent Number: 6,010,384
[45] Date of Patent: Jan. 4, 2000

[54] LIQUID CRYSTAL DISPLAY DEVICE AND METHOD FOR MANUFACTURING THE SAME

[75] Inventors: Tetsuya Nishino, Himeji; Hirokazu Morimoto; Takaomi Tanaka, both of Hyogo-ken, all of Japan

[73] Assignee: Kabushiki Kaisha Toshiba, Kawasaki, Japan

[21] Appl. No.: 09/141,729

[22] Filed: Aug. 27, 1998

[30] Foreign Application Priority Data

Aug. 29, 1997 [JP] Japan ..................................... 9-234079
Aug. 29, 1997 [JP] Japan ..................................... 9-234080

[51] Int. Cl.[7] .................................................. G02F 1/161
[52] U.S. Cl. ............................................ 445/24; 349/187
[58] Field of Search ................................. 445/24; 349/187

[56] References Cited

U.S. PATENT DOCUMENTS 4,165,157  8/1979  Kobale et al. ........................... 349/187

FOREIGN PATENT DOCUMENTS

9-127469  5/1997  Japan .

Primary Examiner—Kenneth J. Ramsey
Attorney, Agent, or Firm—Pillsbury Madison & Sutro

[57] ABSTRACT

Spacers are studded in line like islands at substantially regular intervals on an opposing substrate mother glass. The spacers are brought into contact with a scribe line, i.e., a crack, formed on an array substrate mother glass. When a shock is applied uniformly to the opposing substrate mother glass in a position just above the scribe line, the shock is concentrated on the spacers and transmitted to the array substrate mother glass via the spacers. As a result, the crack forming the scribe line is extended substantially perpendicular to the glass surface, so that the array substrate mother glass can be cut without generating cut defects.

15 Claims, 8 Drawing Sheets

LIQUID CRYSTAL DISPLAY DEVICE AND METHOD FOR MANUFACTURING THE SAME

BACKGROUND OF THE INVENTION

The present invention relates to a display device, such as a liquid crystal display device, and a method for manufacturing the same, and more particularly to a cutting method for cutting a glass substrate constituting a liquid crystal display device.

In general, a liquid crystal display device is manufactured as follows.

Two glass substrates each having electrodes are prepared. Spacers are provided on the overall surface of one of the glass substrates to keep the distance between the substrates constant when they are adhered to each other. The spacers are fixed to predetermined positions of the substrate by, for example, the photolithography process. The spacers are arranged uniformly in a display area, i.e., an area surrounded by sealing material applied in a subsequent process. In a peripheral area, outside the display area, the spacers are arranged uniformly at a density lower than that in the display area. A sealing material is applied to one of the glass substrates, the two substrates are adhered to each other, and then the sealing material is cured. The two glass substrates are cut into a desired size, and a liquid crystal material is sealed between the two substrates, thus forming a liquid crystal display device.

The dicing and piezoelectrical methods are known as methods for cutting glass substrates. Of the methods, the scribing method is most generally employed. Glass substrates are cut by the scribing method in the following manner.

A predetermined cut line is scribed on a surface of a glass substrate by a scriber made of a hard material, such as sharp-edged diamond, thereby forming a crack along the cut line. The crack is extended by shock applied on the other surface of the glass substrate on which the crack is not formed, so that the glass substrate can be cut.

To cut a glass substrate of a liquid crystal display device, a cut line on a surface of the glass substrate is scribed, thereby forming a crack, i.e., a scribe line, along the cut line. A shock is given uniformly to the glass substrate by a rod-like member made of rubber, called a brake bar, along the scribe line from the other surface of the glass substrate. As a result, the glass substrate is broken along the scribe line, so that it can be cut into a desired size.

In the steps of manufacturing a liquid crystal display device, first and second glass substrates adhered to each other via spacers are cut in the following manner. The spacers are fixedly formed on predetermined positions of the second glass substrate.

A scribe line is formed on a surface of the first glass substrate. A shock is uniformly given along the scribe line by a brake bar to a surface of the second glass substrate opposing to the first glass surface, thereby cutting the first glass substrate.

At this time, since there are only spacers between the two glass substrates, the shock given by the brake bar is transmitted from the second glass substrate to the first glass substrate through the spacers. For this reason, the shock is concentrated on the spacers, and the crack formed by the scriber is liable to extend toward the spacers by the shock. Therefore, the shape of a cross section of the glass substrates after cutting is related very closely to the positions of the spacers.

In the peripheral area, since the spacers are arranged in portions separated from the scribe line at a comparatively lower density, the crack may extend toward the spacers. Therefore, the cut surface of the glass substrates is not substantially perpendicular to the main surface of the substrate, but a sharp, irregular cross section is formed. Thus, the aforementioned arrangement of the spacers raises problems such as a high possibility of cut defects and a low manufacturing yield. The cut defects may easily cause a glass crack in the subsequent manufacturing steps. A piece of cracked glass may enter a gap between the glass substrates or between a glass substrate and a polarizing plate; that is, a so-called "fragment jam defect" may occur.

In general, the position at which the brake bar applies a shock to a glass substrate (the brake position) may probably be shifted by about 1 mm from the scribe line. If a shock is given to the glass substrate with the brake bar shifted from the scribe line, the shock may be transmitted to spacers located apart from the scribe line. In this case, a number of cut defects may be generated, producing glass cracks or fragments, with the result that the manufacturing yield is lowered.

Further, in most liquid crystal display devices, an array substrate has a plurality of driving circuits in the peripheral area. In particular, a number of wiring patterns are formed around the scribe line. If a spacer is placed on a wiring pattern, the height of the spacer is greater than that of another spacer located on the glass substrate by the thickness of the wiring pattern. Therefore, the shock given by the brake bar is not uniformly transmitted to all the spacers, but concentrated on the spacers on the wiring patterns. In this case, cut defects may easily occur and the wiring pattern may be damaged by the shock, with the result that the manufacturing yield is lowered.

As described above, the structure wherein spacers are arranged at a comparatively low density in positions apart from the scribe line has the following problems. When the glass substrate is cut, cut defects are liable to occur depending on the positions of the spacers, the shift of the brake position with respect to the scribe line, and the positional relationship between the spacer and the wiring pattern. If the cut defects occur, glass cracks or fragments may be produced in the subsequent steps, resulting in a low manufacturing yield.

BRIEF SUMMARY OF THE INVENTION

The present invention has been made to solve the above problems, and its object is to provide a liquid crystal display device and a method for manufacturing the same, which can prevent cut defects and reduction of the manufacturing yield due to glass cracks or fragments.

According to the present invention, there is provided a method for manufacturing a liquid crystal display device comprising the steps of:

arranging first and second substrates so as to face each other;

adhering the first and second substrates by a sealing material surrounding a predetermined region in which a liquid crystal material is sealed between the first and second substrate; and cutting at least one of the first and second substrates into a predetermined size along a cut line outside the predetermined region surrounded by the sealing material, wherein spacers for keeping a distance between the first and second substrates constant are arranged on the cut line.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

A liquid crystal display device and a method for manufacturing the same according to the present invention will be described with reference to the accompanying drawings.

Figure 1:
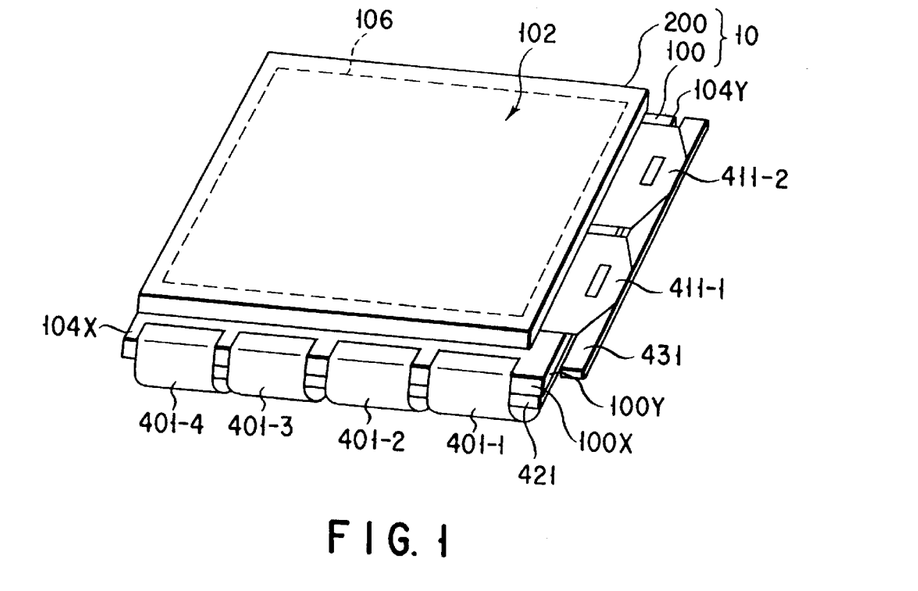
FIG. 1 is a schematic perspective view showing a liquid crystal display panel applied to a liquid crystal display device according to an embodiment of the present invention.

An embodiment of the present invention is an active matrix liquid crystal display device having a display area of, for example, a diagonal of 14 inch. The display device has a liquid crystal display panel 10 as shown in FIG. 1.

The liquid crystal display panel 10 comprises a first substrate, i.e., an array substrate 100, a second substrate, i.e., an opposing substrate 200, and a liquid crystal material interposed between the array substrate 100 and the opposing substrate 200. The liquid crystal display panel 10 has a first area, i.e., a display area 102 for displaying an image, and a second area, i.e., peripheral areas 104X and 104Y having wiring pads connected to driving circuits. The display area 102 is formed in a region surrounded by a sealing material 106 for adhering the array substrate 100 and the opposing substrate 200. The peripheral areas 104X and 104Y are formed in a region outside the sealing material 106.

Figure 2:
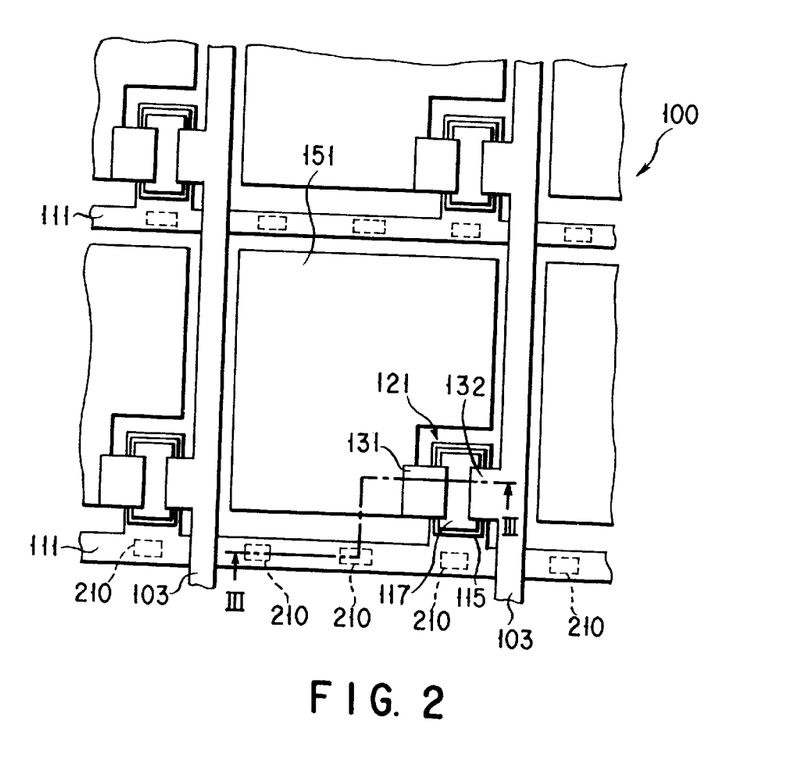
FIG. 2 is a schematic plan view showing a structure of an array substrate in a display area of the liquid crystal display panel shown in FIG. 1.
Figure 3:
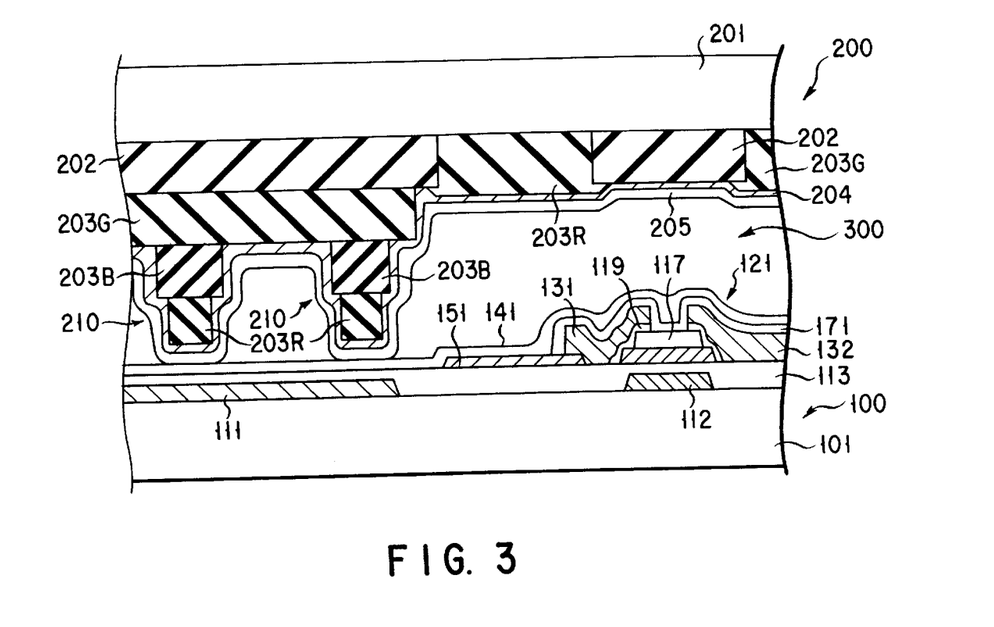
FIG. 3 is a schematic cross-sectional view of the array structure shown in FIG. 2 taken along the line III—III.

As shown in FIGS. 2 and 3, the display area 102 of the array substrate 100 includes, for example, 1024×3 signal lines 103 and 768 scanning lines 111 perpendicular to the signal lines 103. The scanning lines 111 are arranged on an insulating substrate, for example, a glass substrate 101 of a thickness of 0.7 mm. The scanning line 111 is made of a low-resistance material, such as aluminum or molybdenum-tungsten, and formed directly on the glass substrate 101. The signal line 103 is formed of a low-resistance material such as aluminum and formed on a gate insulating film 113 which is formed on the glass substrate 101. The gate insulating film 113 is formed of a multi-layered film constituted by silicon oxide and silicon nitride layers.

The array substrate 100 comprises thin film transistors (TFTs) 121, serving as switching elements, each arranged near the intersection between a signal line 103 and a scanning line 111. The array substrate 100 further comprises pixel electrodes 151 connected to the signal lines 103 through the TFTs 121. The pixel electrode 151 is made of a transmitting conductive material, for example, ITO (Indium Tin Oxide).

The TFT 121 has a gate electrode 112 extended from the scanning line 111, as shown in FIGS. 2 and 3. A semiconductor film 115, formed of an amorphous silicon (a-Si:H) film, is formed above the gate electrode 112 via the gate insulating film 113. A channel protecting film 117, made of silicon nitride, is accumulated on the semiconductor film 115.

A source electrode 131 of the TFT 121 electrically connects the semiconductor film 115 and the pixel electrode 151 via a low resistance semiconductor film 119 formed of an $n^+$-type amorphous silicon ($n^+$-type a-Si:H) film. A drain electrode 132 of the TFT 121 is formed integral with the signal line 103. The drain electrode 132 electrically connects the semiconductor film 115 and the signal line 103 via the low resistance semiconductor film 119. The channel protecting film 117, the source electrode 131 and the drain electrode 132 are covered by a protecting film 171 made of an insulating film, such as silicon nitride.

The main surface of the array substrate 100 is covered by an alignment film 141 for aligning a liquid crystal composition 300 interposed between the array substrate 100 and the opposing substrate 200.

The display area 102 of the opposing substrate 102 has a light-shielding film 202 on a transparent insulating substrate, for example, a glass substrate 201 having a thickness of 0.7 mm. When the opposing substrate 200 faces the array substrate 100, the light-shielding film 202 shields a region facing the wiring patterns of the array substrate 100 from light. The light-shielding film 202 faces a gap between the TFT 121 and the signal line 103 of the array substrate 100, a gap between the pixel electrode 151 and the signal line 103 and a gap between the pixel electrode 151 and the scanning line 111. The light-shielding film 202 is made of, for example, chromium or resin.

The opposing substrate 200 comprises color filters 203R, 203G and 203B in regions respectively facing the pixel electrodes 151 of the array substrate 100 to color light beams transmitted from the array substrate 100 to the opposing substrate 200. In other words, the opposing substrate 200 has three color filters 203R, 203G and 203B of the three primary colors: red (R), green (G) and blue (B) in each pixel.

The opposing substrate 200 further comprises an opposing electrode 204 made of ITO, which covers the overall surfaces of the color filters 203R, 203G and 203B.

The main surface of the opposing substrate 200 is covered by an alignment film 205 for aligning the liquid crystal composition 300 interposed between the array substrate 100 and the opposing substrate 200.

Polarizing plates (not shown) are attached to the surfaces of the liquid crystal display panel, i.e., the outer surfaces of the glass substrate 101 and the glass substrate 201. The polarizing directions of the polarizing plates are perpendicular to each other.

Spacers 210, for keeping constant the distance between the array substrate 100 and the opposing substrate 200, are provided on the opposing substrate 200, as shown in FIG. 3. The spacer is formed by accumulating the light-shielding film 202 and the color filters 203G, 203B and 203R. As shown in FIGS. 2 and 3, the spacer 210 is located above the scanning line 111 of the array substrate 100 via the gate insulating film 113, when the array substrate and the opposing substrate 200 face each other.

The spacer 210 is formed in the following manner.

The opposing substrate 200 is coated with photo-sensitive black resin by spinner coating. The resin is then dried. The resin is exposed through a photomask having a shape corresponding to a predetermined pattern, i.e., the wiring pattern of the array substrate 100. Thereafter, development and sintering processes are performed, thereby forming a light-shielding film 202 for shielding the region corresponding to the wiring pattern from light.

Subsequently, the overall surface of the opposing substrate 200 is coated by spinner coating with ultraviolet-curing acrylic resin, in which green pigments are dispersed. The acrylic resin is then dried, and exposed through photomasks having shapes respectively corresponding to a green pixel region and a region opposing to the scanning line 111 on the black light-shielding film 202. Thereafter, development and sintering processes are performed, thereby forming a green color filter 203G.

Subsequently, in the same manner as forming the green color filter 203G, a blue color filter 203B is formed on a blue pixel region and the green color filter 203G formed on a region opposing to the scanning line 111.

Subsequently, in the same manner as forming the green color filter 203G, a red color filter 203R is formed on a red pixel region and the blue color filter 203B formed on the region opposing to the scanning line 111.

Thus, the black light-shielding film 202 and the color filters 203G, 203B and 203R are sequentially accumulated in the portion opposing to the scanning line 111 by utilizing the photolithography step for forming the light-shielding film 202 and the color filters 203G, 203B and 203R, thereby forming a pillar-like spacer 210. As shown in FIG. 3, the light-shielding film 202 and the green color filter 203G of the spacer 210 are accumulated parallel to the scanning line 111. The blue color filters 203B, having a predetermined width in the direction of the wiring of the scanning line 111, are accumulated on the green color filter 203G with a predetermined distance therebetween. The red color filters 203R, having a width smaller than that of the blue color filter, are accumulated on the blue color filter 203B with a predetermined distance therebetween.

In this embodiment, the spacer 210 is formed in a position opposing to the scanning line 111. However, it can be formed in a position opposing to another wiring, for example, the signal line 103. Further, in this embodiment, the spacers 210 are arranged at intervals of about 50 μm. However, the intervals can be determined most suitably in accordance with the size of the display area 102 of the liquid crystal display device and the size of the spacers 210.

Figure 4:
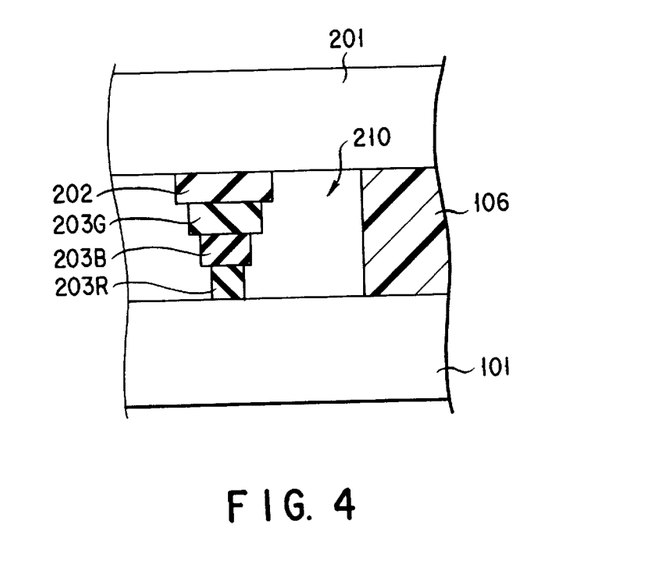
FIG. 4 is a schematic cross-sectional view showing a structure of a peripheral area of the liquid crystal display panel shown in FIG. 1.

In the peripheral areas 104X and 104Y of the liquid crystal display panel 10, as shown in FIG. 4, the black light-shielding film 202 and the green, blue and red color filters 203G, 203B and 203R are accumulated, thereby forming a spacer 210. FIG. 4 shows a cross section viewed in a direction perpendicular to the wiring direction of the scanning line 111. As shown in FIG. 4, an upper layer of the spacer 210 has a smaller width. Therefore, when the light-shielding film 202 and the color filters 203G, 203B and 203R are accumulated, even if mask misalignment occurs, a stable spacer can be obtained.

The spacers 210 in the peripheral areas 104X and 104Y are formed by utilizing the step of forming a light-shielding film 202 of the opposing substrate 201 in the display area 102 and the steps of forming the color filters. Therefore, the spacers 210 can be formed in the peripheral areas 104X and 104Y at the same time as forming the opposing substrate 201, without a special step for forming the spacers 210.

In the liquid crystal display panel 10, to reduce the outer dimensions of the liquid crystal display device, in particular, the frame size, the signal lines 103 wired in the display area 102 are led only on the side of a first end 100X of the peripheral area 104X of the array substrate 100 shown in FIG. 1 (not illustrated in detail). The peripheral area 104X includes these signal lines 103 and wiring pads electrically connect to driving circuits for supplying signals to the signal lines 103. The wiring pads are connected by anisotropic conductive adhesive to the driving circuits X-TAB 401-1, 401-2, 401-3 and 401-4 for supplying image data to the signal lines 103 on the side of the first end 100X. The width of the peripheral area 104X, i.e., the distance between an outer end of the sealing material 106 and the first end 100X, is about 3.2 mm.

The scanning lines 111 wired in the display area 102 are led only on the side of a second end 100Y (perpendicular to the first end 100X) of the peripheral area 104Y of the array substrate 100. The peripheral area 104Y includes these scanning lines 111 and wiring pads electrically connect to driving circuits for supplying signals to the scanning lines 111. The wiring pads are connected by anisotropic conductive adhesive to the driving circuits Y-TAB 411-1 and 411-2 for supplying scanning pulses to the scanning lines 111 on the side of the second end 100Y. The width of the peripheral area 104Y, i.e., the distance between an outer end of the sealing material 106 and the second end 100Y, is about 3.5 mm.

The driving circuits X-TAB 401-1, 401-2, 401-3 and 401-4 are bent to the rear surface of the liquid crystal display panel 10 and connected by anisotropic conductive adhesive to an X control circuit board 421 for controlling the driving circuits X-TAB 401-1, 401-2, 401-3 and 401-4.

The driving circuits Y-TAB 411-1 and 411-2 are arranged on a side portion of the liquid crystal display panel 10 and connected by anisotropic conductive adhesive to a Y control circuit board 431 for controlling the driving circuits Y-TAB 411-1 and 411-2.

The driving circuits X-TAB 401-1, 401-2, 401-3 and 401-4 and the driving circuits Y-TAB 411-1 and 411-2 may be electrically connected by soldering to the X control circuit board 421 and the Y control circuit board 431, respectively.

The spacers 210 shown in FIG. 4 are arranged in portions of the opposing substrate, which do not face the lines formed on the peripheral areas 104X and 104Y of the array substrate.

Figure 5:
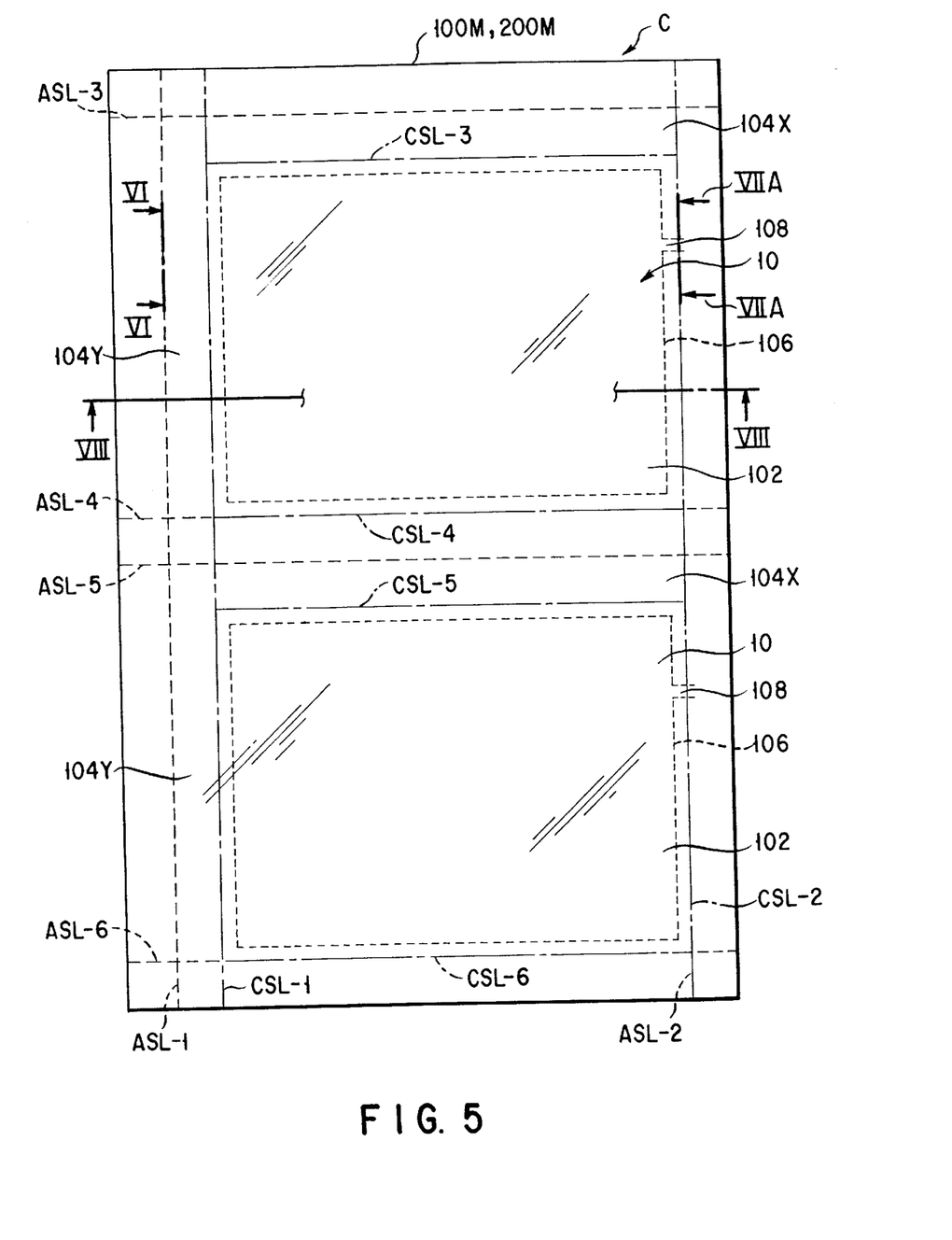
FIG. 5 is a schematic plan view showing a cell which is obtained by adhering an array substrate mother glass to an opposing substrate mother glass by a sealing material, and from which a liquid crystal display panel 10 is cut out.

FIG. 5 is a plan view showing a cell C from which a liquid crystal display panel 10 is cut out. The cell C is obtained by adhering an array substrate mother glass 100M to an opposing substrate mother glass 200M by a sealing material. The array substrate mother glass 100M and the opposing substrate mother glass 200M have substantially the same outer dimensions.

To cut out a liquid crystal display panel 10 of a predetermined size from the array substrate mother glass 100M and the opposing substrate mother glass 200M, cut lines on the surfaces of the mother glasses are scribed, thereby forming cracks (i.e., scribe lines) along the cut lines.

On the array substrate mother glass 100M, formed are first and second scribe lines ASL-1 and ASL-2 parallel to the signal lines and third to sixth scribe lines ASL-3 to ASL-6 parallel to the scanning lines. On the opposing substrate mother glass 200M, formed are first and second scribe lines CSL-1 and CSL-2 parallel to the signal lines and third to sixth scribe lines CSL-3 to CSL-6 parallel to the scanning lines. The scribe lines CSL-2, CSL-4, and CSL-6 are formed on positions which substantially face the scribe line ASL-2, ASL-4, and ASL-6, respectively.

A shock is given along the scribe line formed on the array substrate mother glass 100M from the side of the opposing substrate mother glass 200M, so that the crack can be extended, thereby cutting the array substrate mother glass 100M. Further, a shock is given along the scribe line formed on the opposing substrate mother glass 200M from the side of the array substrate mother glass 100M, so that the crack can be extended, thereby cutting the opposing substrate mother glass 200M.

Figure 6:
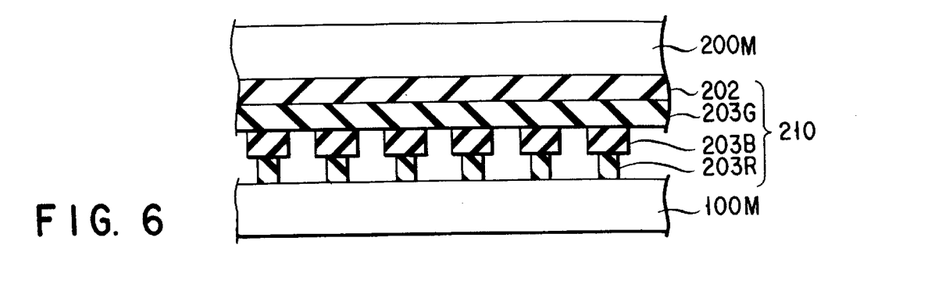
FIG. 6 is a schematic cross-sectional view of the cell shown in FIG. 5 taken along the line VI—VI.

FIG. 6 shows a cross section of the mother glasses taken along the line VI—VI on the first scribe line ASL-1. As shown in FIG. 6, spacers 210, each formed of the light-shielding film 202 and the color filters 203 (G, B, R) accumulated thereon, are arranged at intervals of about 50 μm and brought into contact with the first scribe line ASL-1 of the array substrate mother glass 100M.

In the same manner, spacers 210 formed on the opposing substrate mother glass 200M at regular pitches are brought into contact with the other scribe lines, i.e., the second to sixth scribe lines ASL-2 to ASL-6 of the array substrate mother glass 100M. However, spacers are not necessarily brought into contact with all the scribe lines formed on the array substrate mother glass. It is only necessary that the spacers 210 are arranged so as to be brought into contact with at least the scribe lines ASL-1, ASL-3 and ASL-5 corresponding to the edges which define the peripheral areas 104X and 104Y, when the liquid crystal display panel 10 is cut out from the mother glasses.

As described before, each spacer 210 is formed of the light-shielding film 202 extending straight along the scribe line on the opposing substrate mother glass 200M, the green color filter 203G extending straight and accumulated on the light-shielding film 202, the blue color filter 203B accumulated like an island on the green color filter 203G and the red color filter 203R accumulated like an island on the blue color filter 203B.

Figure 7A:
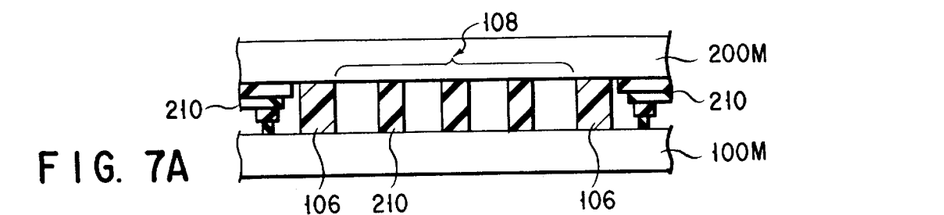
FIG. 7A is a schematic cross-sectional view of the cell shown in FIG. 5 taken along the line VIIA—VIIA.

FIG. 7A shows a cross section of the mother glasses taken along the line VIIA—VIIA on the second scribe line ASL-2 and CSL-2. In the same manner as in the case of FIG. 6, the spacers 210 are arranged at intervals of about 50 μm and brought into contact with the second scribe line ASL-2 of the array substrate mother glass 100M. No spacers are arranged in an injection port 108 defined by the sealing material 106 on the second scribe line ASL-2. For this reason, after the array substrate is cut out from the array substrate mother glass 100M along the second scribe line ASL-2 and the opposing substrate is cut out from the opposing substrate mother glass 200M along the second scribe line CSL-2, fragments of the spacers are not left near the injection port 108. Therefore, when liquid crystal material is injected through the injection port 108, a problem of spacers fragments being mixed into the liquid crystal material is prevented.

Figure 7B:
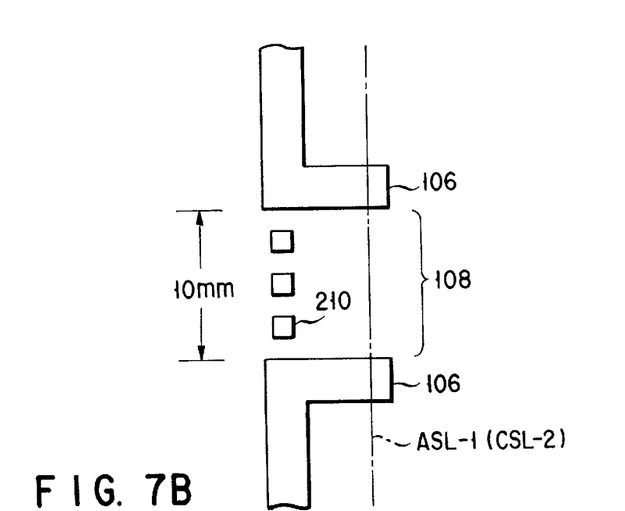
FIG. 7B is an enlarged plan view showing an injection port and a surrounding portion on a second scribe line of the cell shown in FIG. 5.

The injection port 108 has a width of about 10 mm along the second scribe line ASL-2. In the injection port 108, as shown in FIG. 7B, spacers 210 are arranged at intervals parallel with the second scribe line ASL-2 to keep the distance between the array substrate mother glass 100M and the opposing substrate mother glass 200M. These spacers are secured to the opposing substrate mother glass 200M, unlike the spacer fragments left on the scribe line. Therefore, when a liquid crystal material is injected through the injection port 108, the possibility of the spacer 210 being mixed into the liquid crystal material is very low.

FIG. 7B is an enlarged cross-sectional view of the portion near the injection port 108 on the second scribe line ASL-2, in a case where spacers 210 are not arranged on the second, fourth and sixth scribe lines ASL-2, ASL-4 and ASL-6 of the array substrate mother glass 100M. As shown in FIG. 7B, spacers 210 are not arranged on the second scribe line ASL-2 of the array substrate mother glass 100M. Accordingly, spacers 210 are not arranged near the injection port 108 on the second scribe line ASL-2. Therefore, when liquid crystal material is injected through the injection port 108, a problem of spacers fragments being mixed into the liquid crystal material is prevented.

In the injection port 108, as described above, spacers 210 are arranged at intervals parallel to the second scribe line ASL-2. Therefore, when a liquid crystal material is injected through the injection port 108, the possibility of the spacer 210 being mixed into the liquid crystal material is very low.

Figure 8:
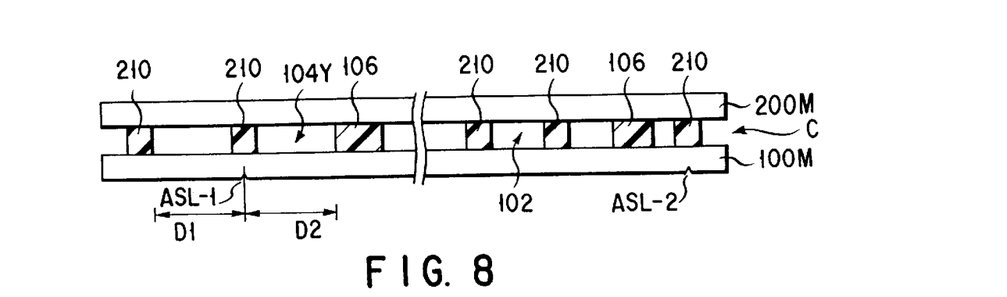
FIG. 8 is a schematic cross-sectional view of the cell shown in FIG. 5 taken along the line VIII—VIII.

FIG. 8 shows a cross section of the mother glasses taken along the line VIII—VIII perpendicular to the first and second scribe lines ASL-1 and ASL-2. In FIG. 8, the structure of the spacer 210 is drawn rough. It is assumed that the spacers 210 are brought into contact with at least the first and second scribe lines ASL-1 and ASL-2 of the array substrate mother glass 100M.

For example, the peripheral area 104Y as shown in FIG. 8 has spacers 210 which are in contact with the first scribe line ASL-1 of the array substrate mother glass 100M.

A distance D1 between the first scribe line ASL-1 and the sealing material 106 is 3 mm or more. In the region between the first scribe line ASL-1 and the sealing material 106, no spacer 210 is provided in a region within at least 3 mm from the first scribe line ASL-1. A distance D2 between the first scribe line ASL-1 and the nearest spacer 210 is 3 mm or more.

Although spacers may be arranged in a region within 3 mm from the scribe line, it is preferable that the density of spacers be lower than that on the scribe line. With this arrangement of spacers, when a shock is applied to the scribe line, it is more concentrated at the scribe line, as will be described later.

As shown in FIG. 8, the spacers 210 are arranged at regular intervals in the display area 102. The spacers in the display area 102 are arranged uniformly at a density of about 10 pieces/mm$^2$.

On the other hand, the spacers 210 are in contact with the second scribe line ASL-2. The spacers 210 are arranged near the sealing material 106.

Figure 9:
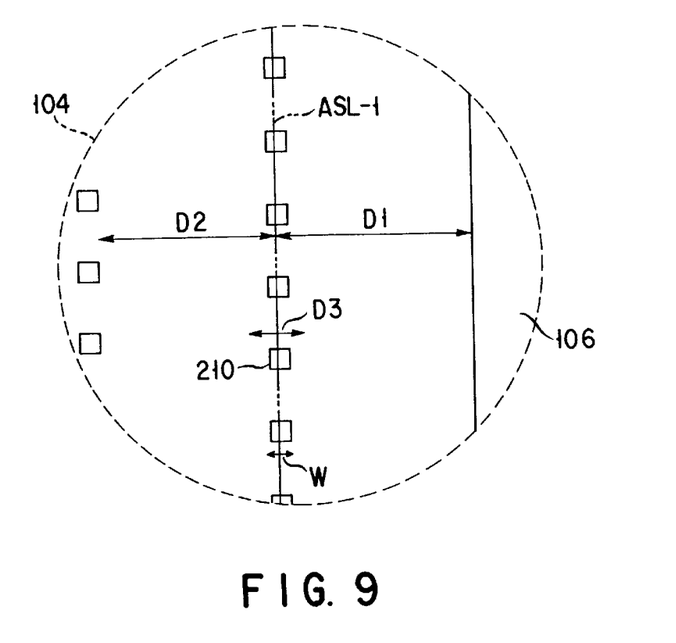
FIG. 9 is an enlarged plan view showing a first scribe line and a surrounding portion formed on the array substrate mother glass of the cell shown in FIG. 5.

FIG. 9 shows the first scribe line and a surrounding portion.

A region having a width D3, for example, 1 mm, in the central portion of which the first scribe line ASL-1 is extending, is referred to as a cut region. The cut region includes the scribe line with which the spacers 210 are brought into contact, and a region near the scribe line. As shown in FIG. 9, the spacers 210 are arranged straight along the first scribe line ASL-1 at substantially regular intervals. In this embodiment, one side of the spacer 210 formed in the cut region has a width of 20 to 50 μm.

A method for manufacturing the liquid crystal display device described above will now be described.

First, an array substrate mother glass 100M and an opposing substrate mother glass 200M are prepared. As shown in FIG. 3, the array substrate mother glass 100M includes a plurality of parallel scanning lines 111 along the line direction of the transparent glass substrate 101, a plurality of parallel signal lines 103 along the column direction thereof, pixel electrodes 151 corresponding in number to pixels, and TFTs 121 corresponding in number to the pixels. The opposing substrate mother glass 200M includes, as shown in FIG. 3, light-shielding films 202, color filters 203 (G, B, R), an opposing electrode 204, and spacers 210. The spacers 210 are arranged in the display area 102 and the peripheral areas 104 (X, Y) at predetermined densities. Each spacer 210 is made of the light-shielding film 202 and the color filters accumulated one on another.

The array substrate mother glass 100M and the opposing substrate mother glass 200M are then washed. Thereafter, polyimide films are formed on the display areas 102 of the mother glasses. Then, the polyimide films are rubbed in predetermined directions, thereby forming alignment films 141 and 205.

The mother glasses are washed again. Subsequently, as shown in FIG. 5, a sealing material 106 is applied to the array substrate mother glass 100M or the opposing substrate mother glass 200M, and the two mother glasses are adhered to each other, thereby forming a cell. At this time, they are adhered such that the spacers 210 formed on the opposing mother glass 200M can be brought into contact with a scribe line, which will be formed later on the array substrate mother glass 100M. Then, the sealing member 106 is cured. An injection port 108, through which a liquid crystal material will be injected, is formed, when the sealing material 106 is applied.

Thereafter, the array substrate mother glass 100M and the opposing substrate mother glass 200M are cut into a desired size. The cutting step will be described later in detail.

Subsequently, a liquid crystal material is injected into a space between the two substrates of the liquid crystal display panel 10 cut out from the mother glasses. The liquid crystal material is sealed by a sealing member.

Then, a polarizing plate is attached to the surfaces of the array substrate 100 and the opposing substrate 200.

Thereafter, as shown in FIG. 1, driving circuits 401-1 to 401-4, 411-1 and 411-2 are connected to the wiring pads formed in the peripheral areas 104X and 104Y of the array substrate 100.

A back light is attached to the rear surface of the liquid crystal display panel 10, i.e., on the side of the array substrate 100. Thus, a liquid crystal display device is completed.

A cutting step in the process of manufacturing the aforementioned liquid crystal display device will now be described in detail. It is assumed that the spacers 210 are in contact with all the scribe lines of the array substrate mother glass 100M except for the portion of the injection port 108.

FIGS. 10A to 10F are diagrams for explaining steps for cutting the mother glasses shown in FIG. 5. The steps will be described with reference to the cross-sectional view taken along the line G–H shown in FIG. 5.

Figure 10A:
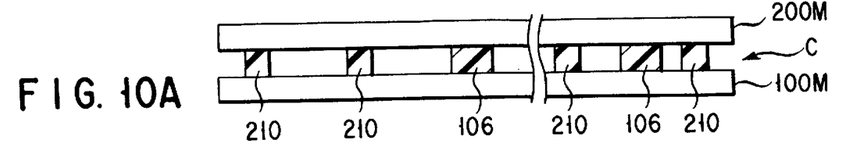
FIGS. 10A to 10F are cross-sectional views for explaining steps for cutting out a liquid crystal display panel from the cell shown in FIG. 5.

First, as shown in FIG. 10A, a cell C is prepared, which is formed of the array substrate mother glass 100M and the opposing substrate mother glass 200M adhered by the sealing material 106.

Figure 10B:
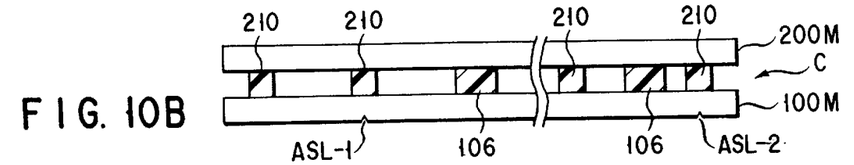

Then, scribe lines are formed on the surface of the array substrate mother glass 100M. More specifically, as show in FIG. 5, first and second scribe lines ASL-1 and ASL-2 parallel to the signal lines and third to sixth scribe lines ASL-3 to ASL-6 parallel to the scanning lines are formed. FIG. 10B shows the first and second scribe lines ASL-1 and ASL-2. The cell C is placed on a stage with the array substrate mother glass 100M directed downward.

Figure 10C:
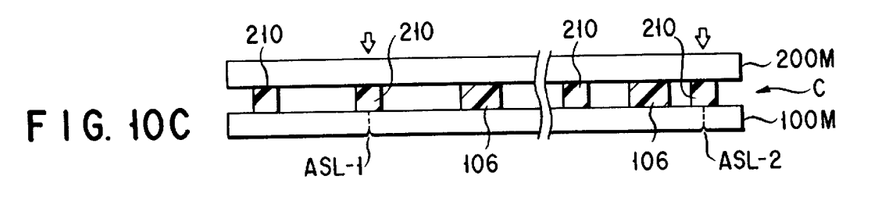

Further, as shown in FIG. 10C, a uniform shock is applied to the opposing substrate mother glass 200M of the cell C along the scribe line. The shock is given uniformly along the scribe line by a rod-like member extending in one direction, made of rubber, called a brake bar.

The shock is transmitted to the array substrate mother glass 100M through the spacers 210 in contact with the scribe lines, i.e., the spacers formed on the opposing substrate mother glass 200M. The cracks forming the scribe lines are extended toward the spacers 210.

In the same manner, shocks are applied along all the scribe lines to extend the cracks.

Figure 10D:
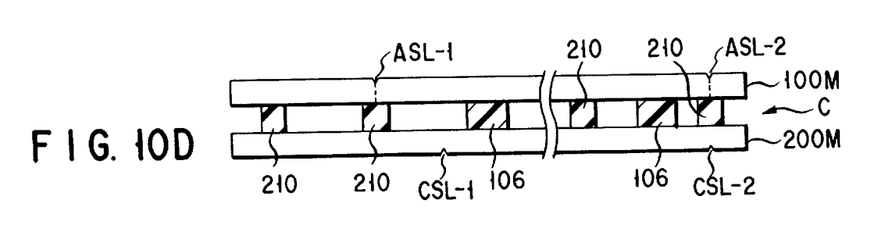

Further, as shown in FIG. 10D, scribe lines are formed on the opposing substrate mother glass 200M. More specifically, as shown in FIG. 5, first and second scribe lines CSL-1 and CSL-2 parallel to the signal lines and third to sixth scribe lines CSL-3 to CSL-6 parallel to the scanning lines are formed. FIG. 10D shows the first and second scribe lines CSL-1 and CSL-2. The cell C is placed on the stage with the opposing substrate mother glass 200M directed downward.

Figure 10E:
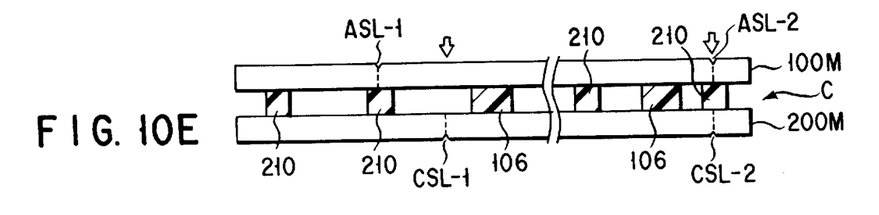

Then, as shown in FIG. 10E, a uniform shock is applied to the array substrate mother glass 100M of the cell C along the scribe line. The shock applied along the first scribe line CSL-1 is transmitted to the opposing substrate mother glass 200M through the sealing material 106 formed near the first scribe line CSL-1. The shock applied along the second scribe line CSL-2 is transmitted to the opposing substrate mother glass 200M through the spacers 210 in contact with the second scribe line CSL-2. The cracks forming the scribe lines are extended by the shocks.

In the same manner, shocks are applied along all the scribe lines to extend the cracks.

Figure 10F:
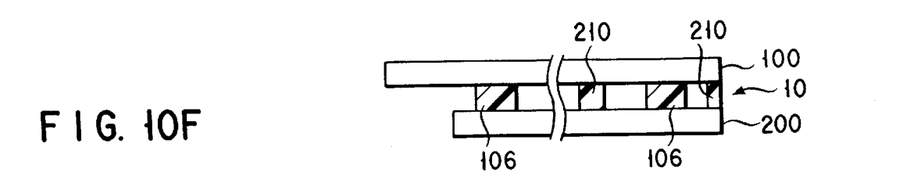

Thus, the cracks of all the scribe lines formed in the array substrate mother glass 100M and the opposing substrate mother glass 200M are extended, thereby cutting out the liquid crystal display panel 10 as shown in FIG. 10F.

At this time, part of the spacers 210 may remain in a region outside the sealing material 106, as shown in FIG. 10F. However, since the spacers 210 are not arranged in the injection port 108 as described above with reference to FIG. 7B, the part of the remaining spacers 210 will not adversely affect the liquid crystal display device.

The sequences of the steps for cutting the liquid crystal display panel 10 from the mother glasses are not limited to those of this embodiment.

As described above, for example, when the array substrate 100 is cut, the shock applied to the opposing substrate mother glass 200M is transmitted to the array substrate mother glass 100M through the spacers arranged at regular intervals on the scribe line at a density higher than that in a region separated from the scribe line. Therefore, the crack forming the scribe line extends substantially perpendicular to the main surface of the substrate, thereby preventing cut defects.

Therefore, in the subsequent liquid crystal injection step or polarizing plate attaching step, occurrence of defects due to glass cracks or glass fragments are suppressed, with the result that the manufacturing yield is improved.

In the method for manufacturing the aforementioned liquid crystal display device, the liquid crystal display panels, wherein spacers are arranged at various positions, are cut, and cut defects generated in the respective cases are compared.

In an experiment condition A, spacers are arranged in a cell at substantially regular intervals parallel with the scribe line at a position 0.3 mm shifted away from the sealing material, i.e., outside the scribe line. In an experiment condition B, spacers are arranged in a cell at substantially regular intervals parallel with the scribe line at a position 0.3 mm shifted therefrom toward the sealing material, i.e., inside the scribe line. In an experiment condition C, spacers are arranged straight at substantially regular intervals in the cut region on the scribe line, as shown in FIG. 9.

Under the conditions A, B and C, the experiments of cutting cells were performed six times. The position at which the brake bar hits the scribe line varies±1 mm with reference to the scribe line.

The sign–(minus) indicates a state shifted from the scribe line toward the sealing material, whereas the sign+(plus) indicates a state shifted from the scribe line away from the sealing material.

Figure 11:
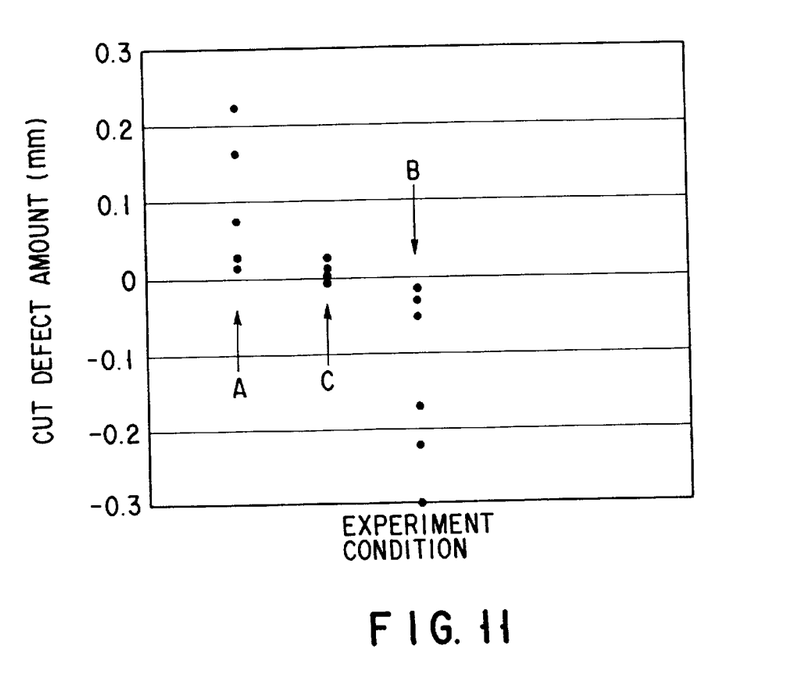
FIG. 11 is a diagram showing results of measurements of amounts of cut defects when the cell is cut, varying the arrangement of the spacers.

The results of the experiments under the aforementioned three conditions are shown in FIG. 11. When a cell is cut, if a cut defect occurs, the crack extends obliquely from the scribe line to the glass surface. In other words, the cut cross section of the glass substrate is not perpendicular to the main surface of the glass substrate, resulting in a sharp, irregular cross section. To quantify a cut defect, the length of a portion between the scribe line and the most distant point of the cut cross section from the scribe line is referred to as a cut defect amount. A minus (–) cut defect amount represents that the cross section extends from the scribe line toward the sealing member, whereas a plus (+) cut defect amount represents that the cross section extends from the scribe line away from the sealing member.

As shown in FIG. 11, the average of the cut defect amounts under the experiment condition A is ±0.1 mm. Assuming that the standard deviation is σ, the value of 3σ is 0.34. Therefore, under the experiment condition A, cut defects may occur with variations of–0.24 mm to+0.44 mm.

Under the experiment condition B, the average of the cut defect amounts is –0.11 mm, and the value of 3σ is 0.44. Therefore, cut defects may occur with variations of –0.55 mm to +0.33 mm.

Under the experiment condition C, the average of the cut defect amounts is +0.01 mm, and the value of 3σ is 0.04. Therefore, cut defects may occur with variations of –0.03 mm to +0.05 mm. As compared to the experiment conditions A and B, the amount of the cut defect is very small and the variation is also small.

As can be understood from the results of the experiments, the possibility of a cut defect is suppressed by arranging spacers at regular intervals on the scribe line. Even if a cut defect occurs, the cut defect amount is so small that it cannot influence the subsequent steps. Thus, the occurrence of cut defects can be suppressed and the yield can be improved.

Next, experiments were performed to measure cut defect amounts at various hit positions of the brake bar, when the liquid crystal display panel used in the condition C wherein the spacers are arranged straight at regular intervals on the scribe line as shown in FIG. 9. More specifically, the brake bar hits the scribe line, a position ±1.0 mm shifted from the scribe line, a position ±1.5 mm shifted from the scribe line, and a position ±2.0 mm shifted from the scribe line. In the respective cases, experiments were repeated a plurality of times and the cut defect amounts were measured. The results of measurements are shown in FIG. 12.

Figure 12:
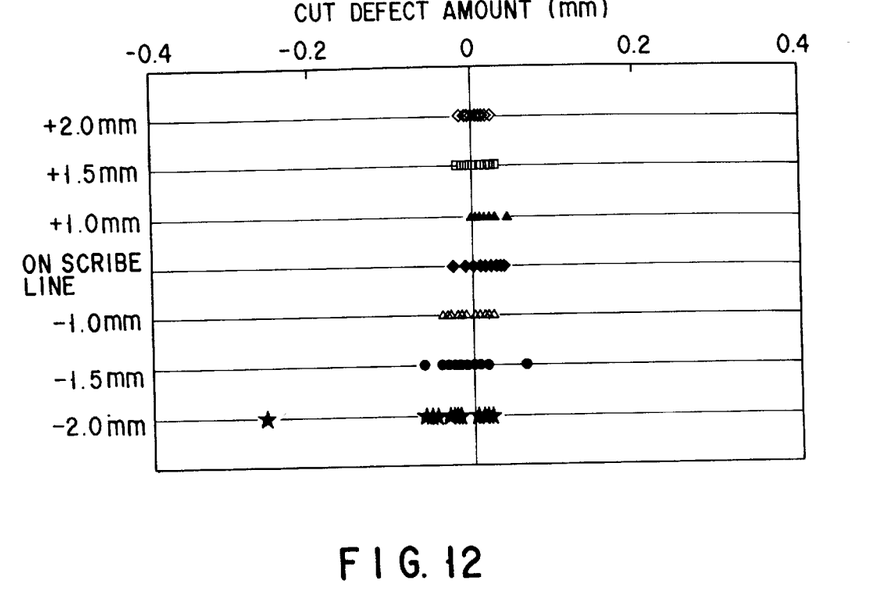
FIG. 12 is a diagram showing results of measurements of amounts of cut defects when the cell is cut, varying the hit position of the brake bar.

As evident from FIG. 12, with the liquid crystal panel of this embodiment, even when the brake bar hits the position at maximum 2 mm shifted from the scribe line, the cut defect amount can be suppressed less than about 100 $\mu$m.

As described above, when the glass substrate is cut, if spacers are arranged straight at regular intervals in the cut region near the scribe line, the crack forming the scribe line can extend substantially perpendicular to the main surface of the substrate, thereby preventing a cut defect. In addition, even if the hit position of the brake bar is varied, since a considerable cut defect will not occur, a glass crack or fragment can be suppressed, thereby increasing the yield.

In the embodiment described above, spacers are arranged just under the scribe line as shown in FIG. 9. However, if it is impossible to arrange spacers just under the scribe line, spacers may be arranged symmetrically on both sides of the scribe line at the same densities. In this case, the shock by the brake bar is transmitted uniformly along the scribe line via the spacers arranged on both sides of the scribe line, resulting in the same effect as that in the case where the spacers are arranged straight just under the scribe line. Therefore, occurrence of a cut defect can be prevented.

Another embodiment of the present invention will now be described.

Figure 13:
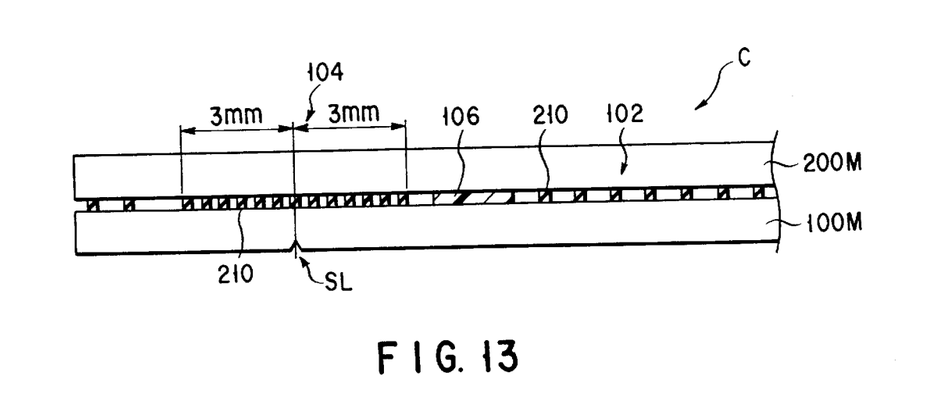
FIG. 13 is a cross-sectional view of a cell for explaining another embodiment of the present invention.
Figure 14:
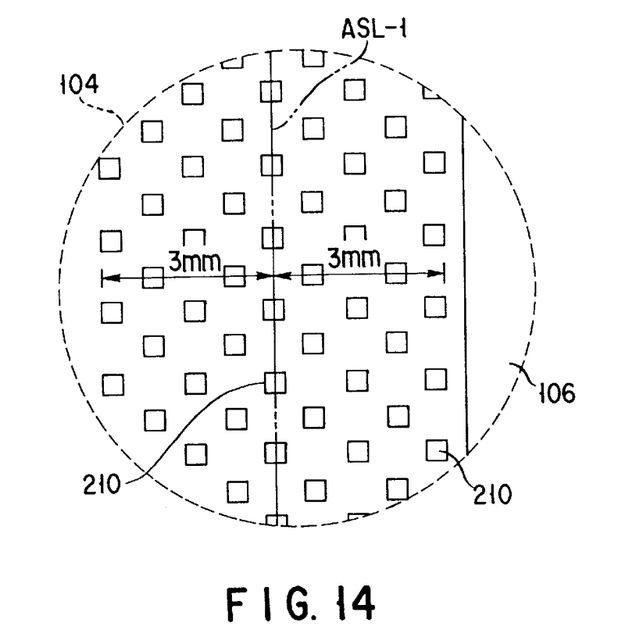
FIG. 14 is an enlarged plan view showing a first scribe line and a surrounding portion formed on the array substrate mother glass of the cell shown in FIG. 13.

In this embodiment, as shown in FIG. 13, spacers 210 are arranged at a higher density in a peripheral area 104 of a cell C than that in a display area 102. Particularly on a scribe line of the array substrate mother glass 100M and in a region within 3 mm from the scribe line, spacers 210 are arranged uniformly and at a high density, as shown in FIG. 14. The density of the spacers 210 in this region is, for example, 12 to 100 pieces/mm$^2$, preferably 15 to 100 pieces/mm$^2$. On the other hand, spacers 210 are arranged in the display area 102 of the liquid crystal display panel 10 at a density of about 10 pieces/mm$^2$.

In the cell having the above structure, for example, when an array substrate mother glass 100M is cut, the shock applied to the opposing substrate mother glass 200M is transmitted to the array substrate mother glass 100M through the spacers 210 arranged uniformly at a high density on and near the scribe line. Therefore, the crack forming the scribe line extends substantially perpendicular to the main surface of the substrate, so that occurrence of a cut defect can be prevented.

Therefore, in the subsequent liquid crystal injection step or polarizing plate attaching step, occurrence of defects due to glass cracks or glass fragments are suppressed, with the result that the manufacturing yield is improved.

In the method for manufacturing the aforementioned liquid crystal display device, the liquid crystal display panels, wherein spacers are arranged at various positions, are cut, and cut defects generated in the respective cases are compared.

The experiment conditions A and B are the same as those in the first embodiment. In an experiment condition D, spacers are arranged in a cell at a density of 15 pieces/mm$^2$ on and around the scribe line, as shown in FIG. 14.

Under the condition D, the experiments of cutting a cell were performed 54 times. The position at which the brake bar hits the scribe line varies ±1 mm with reference to the scribe line.

Figure 15:
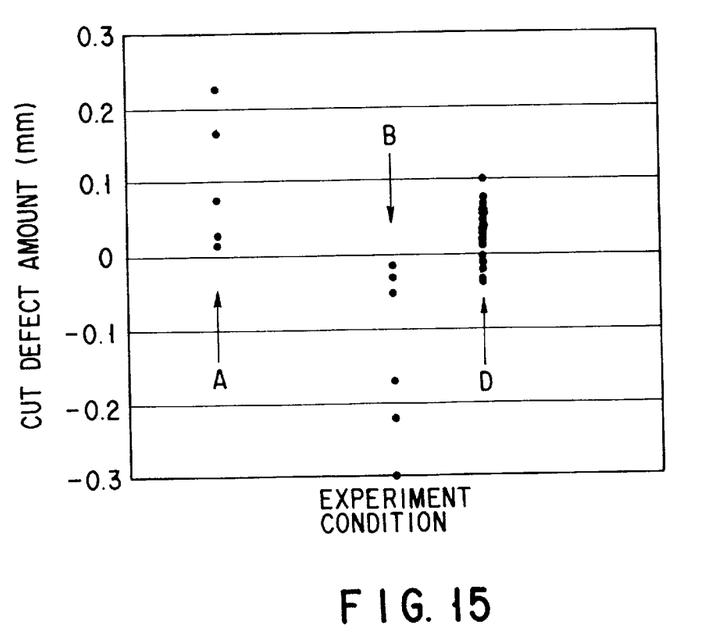
FIG. 15 is a diagram showing results of measurements of amounts of cut defects when the cell shown in FIG. 13 is cut, varying the arrangement of the spacers.

FIG. 15 shows the results of the experiments under the condition D along with the results of the experiments under the conditions A and B.

As shown in FIG. 15, the average of the cut defect amounts under the experiment condition D is 0.04 mm, and the value of 3σ is 0.09. Therefore, under the experiment condition D, cut defects may occur with variations of −0.05 mm to +0.13 mm. As compared to the experiment conditions A and B, the amount of the cut defect is very small and the variation is also small.

As can be understood from the results of the experiments, the possibility of a cut defect is suppressed by arranging spacers uniformly near the scribe line. Even if a cut defect occurs, the cut defect amount is so small that it cannot influence the subsequent steps. Thus, the occurrence of cut defects can be suppressed and the yield can be improved.

As described above, when the glass substrate is cut, if spacers are arranged near the scribe line at a density of at least 12 pieces/mm$^2$, preferably at least 15 pieces/mm$^2$, the crack forming the scribe line can extend substantially perpendicular to the main surface of the substrate, thereby preventing a cut defects. In addition, even if the hit position of the brake bar is varied, since a considerable cut defect will not occur, a glass crack or fragment can be suppressed, thereby increasing the yield.

The present invention is not limited to the embodiments described above, but can be variously modified. For example, the spacer need not be formed by accumulating color filters or the like; that is, the spacer can be formed of a single resin layer in one step. The spacers arranged around the scribe line need not be the same as the spacers in the other portions in arrangement, material, size and shape. Further, all spacers need not be arranged in the same manufacturing step.

In the above embodiments, spacers are studded like islands along the scribe line. However, they can be formed linearly along the scribe line. In this case, the scribe accuracy can be improved as compared to the case where the spacers are studded.

In the above embodiments, thin film transistors serving as switching elements are used in the liquid crystal display device. However, the present invention can be applied to a liquid crystal display device of another driving method. For example, the present invention can be applied to a liquid crystal display device driven by means of thin film diodes (TFDs) or a liquid crystal display device of simple matrix type having no switching element in the substrate.

Further, in the above embodiment, spacers are formed by accumulating a light-shielding film and color filters. However, they can be formed of a single layer of, for example, transparent resin. Furthermore, spacers may be formed by fixing plastic beads to one of the substrates. Although spacers are formed on the opposing substrate in the above embodiments, they can be formed on the array substrate.

As has been described above, the present invention can provide a liquid crystal display device and a method for manufacturing the same, which can prevent cut defects and reduction of the manufacturing yield due to glass cracks or fragments.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for manufacturing a liquid crystal display device comprising the steps of:

arranging first and second substrates so as to face each other;

adhering the first and second substrates by a sealing material surrounding a predetermined region in which a liquid crystal material is sealed between the first and second substrates; and cutting at least one of the first and second substrates into a predetermined size along a cut line outside the predetermined region surrounded by the sealing material, wherein spacers for keeping a distance between the first and second substrates constant are arranged on the cut line.

2. The method for manufacturing a liquid crystal display device according to claim 1, wherein spacers are arranged at least 0.5 mm apart from the cut line except for a region within 3 mm from the cut line.

3. The method for manufacturing a liquid crystal display device according to claim 1, wherein the spacers are arranged in the region within 3 mm from the cut line at a density of at least 12 pieces/mm$^2$.

4. The method for manufacturing a liquid crystal display device according to claim 3, wherein the spacers are arranged in the region within 3 mm from the cut line at a density of 15 pieces/mm$^2$.

5. The method for manufacturing a liquid crystal display device according to claim 1, wherein spacers are arranged in predetermined positions in the predetermined region surrounded by the sealing material to keep the distance between the first and second substrate, said spacers on the cut line being formed in a same step of forming the spacers in the predetermined region.

6. The method for manufacturing a liquid crystal display device according to claim 5, wherein the predetermined region includes a plurality of pixel regions corresponding to a plurality of colors to display the colors, color filters of the plurality of colors of the respective pixel regions are arranged on the second substrate, and the color filters of the plurality of colors are accumulated on the cut line and the predetermined positions in the predetermined region, thereby forming the spacers.

7. The method for manufacturing a liquid crystal display device according to claim 1, wherein the sealing material is provided to form an injection port through which a liquid crystal material is injected into the predetermined region, and the spacers on the cut line are arranged except for the cut line including the injection port.

8. A method for manufacturing a liquid crystal display device comprising the steps of:

arranging first and second substrates so as to face each other, the first substrate including a first area having pixel patterns and a second area located on a periphery of the first area and having wiring pads, and the second substrate including a third area corresponding to the first area and having a electrode and a fourth area corresponding to the second area;

adhering the first and second substrates by a sealing material for separating the first area from the second area; and cutting the first substrate into a predetermined size along a first cut line in the second area and the second substrate into a predetermined size along a second cut line in the fourth area, wherein:

the second substrate has spacers for maintaining a distance between the first and second substrates formed in the third and fourth area, the spacers are brought into contact with the first cut line, and are not formed on the second cut line which is closer to the sealing material than the first cut line in a plane parallel to the first and second substrates.

9. The method for manufacturing a liquid crystal display device according to claim 8, wherein the spacers are arranged at least 0.5 mm apart from the first cut line except for a region within 3 mm from the first cut line.

10. The method for manufacturing a liquid crystal display device according to claim 9, wherein the second cut line is located at least 0.5 mm apart from the first cut line and in a region within 3 mm from the first cut line.

11. The method for manufacturing a liquid crystal display device according to claim 8, wherein the first area is a display area for displaying a plurality of colors including a plurality of pixel regions corresponding to the plurality of colors, color filters of the plurality of colors of the respective pixel regions are arranged on the second substrate, and the color filters of the plurality of colors are accumulated on the first cut line and predetermined positions in the display area, thereby forming the spacers.

12. A liquid crystal display device comprising:

a first substrate having a first area including pixel electrodes and switching elements for driving the pixel electrodes and a second area located on a periphery of the first area and including wiring pads connected to the switching elements;

a second substrate facing the first substrate and including a electrode in an area corresponding to the first area;

spacers, formed on the second substrate, for maintaining a distance between the first and second substrates in the first and second areas; and a liquid crystal material sealed between the first and second substrates, wherein the spacers are arranged in at least a portion of the first and second substrates along peripheries thereof.

13. A method for manufacturing a liquid crystal display device comprising the steps of:

arranging first and second substrates so as to face each other;

adhering the first and second substrates by a sealing material surrounding a predetermined region in which a liquid crystal material is sealed between the first and second substrates; and cutting at least one of the first and second substrates into a predetermined size along a cut line outside the predetermined region surrounded by the sealing material, wherein:

the at least one of the first and second substrates is cut by applying a stress along the cut line in the cutting step; and a distance between the first and second substrates are kept constant by supporting members arranged such that the stress applied in the cutting step is concentrated on the cut line.

14. The method for manufacturing a liquid crystal display device according to claim 13, wherein a first region including the supporting members around the cut line and a second region, which is located on a periphery of the first region and in which the supporting members are not arranged, are provided between the first and second substrates; and the stress is applied to the at least one of the first and second substrates along the cut line in the cutting step by hitting with a rod-like member a region of a surface of the at least one of the first and second substrates corresponding to the first region or the first and second regions.

15. The method for manufacturing a liquid crystal display device according to claim 13, wherein:

a first region including the supporting members around the cut line and a second region, which is located on a periphery of the first region and in which the supporting members are not arranged, are provided between the first and second substrates;

a third region including the supporting members is provided on a periphery of the second region between the first and second substrates; and the stress is applied to the at least one of the first and second substrates along the cut line in the cutting step by hitting with a rod-like member a region of a surface of the at least one of the first and second substrates corresponding to the second region in proximity to the first region.

* * * * *